(12) United States Patent
Wang et al.

(10) Patent No.: US 12,388,132 B2
(45) Date of Patent: Aug. 12, 2025

(54) BOX STRUCTURE, BATTERY, AND ELECTRICAL DEVICE

(71) Applicant: CONTEMPORARY AMPEREX TECHNOLOGY (HONG KONG) LIMITED, Hong Kong (CN)

(72) Inventors: Yong Wang, Ningde (CN); Pengbo Zhao, Ningde (CN); Qing Wang, Ningde (CN); Peng Wang, Ningde (CN); Yujia Hou, Ningde (CN); Xingdi Chen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/823,197

(22) Filed: Sep. 3, 2024

(65) Prior Publication Data
US 2024/0429487 A1    Dec. 26, 2024

Related U.S. Application Data

(63) Continuation of application No. PCT/CN2023/077387, filed on Feb. 21, 2023.

(30) Foreign Application Priority Data

Mar. 3, 2022    (CN) .......................... 202220457196.7

(51) Int. Cl.
*H01M 10/6556* (2014.01)
*H01M 10/656* (2014.01)
*H01M 50/24* (2021.01)

(52) U.S. Cl.
CPC ..... *H01M 10/6556* (2015.04); *H01M 10/656* (2015.04); *H01M 50/24* (2021.01)

(58) Field of Classification Search
CPC . H01M 10/6556; H01M 10/656; H01M 50/24
See application file for complete search history.

(56) References Cited

U.S. PATENT DOCUMENTS

| 2011/0206967 | A1* | 8/2011 | Itsuki ................ H01M 10/6556 |
| | | | 429/120 |
| 2019/0353840 | A1* | 11/2019 | Wang .................... H01L 23/427 |
| 2022/0273975 | A1* | 9/2022 | Svensson .......... H01M 10/0525 |
| 2022/0316818 | A1* | 10/2022 | Fröhlich et al. .... H01M 10/613 |
| 2022/0336900 | A1* | 10/2022 | Merino ................. H01M 50/22 |
| 2023/0216107 | A1* | 7/2023 | Jeon .................... H01M 50/233 |
| | | | 429/120 |

FOREIGN PATENT DOCUMENTS

| CN | 108140913 | A | | 6/2018 |
| CN | 109148771 | A | | 1/2019 |
| CN | 109256511 | A | | 1/2019 |
| CN | 109950441 | A | | 6/2019 |
| CN | 209087962 | U | | 7/2019 |
| CN | 210092152 | U | | 2/2020 |
| CN | 113258162 | A | | 8/2021 |
| CN | 217182329 | U | | 8/2022 |
| CN | 115956321 | B | * | 1/2024 |
| EP | 3937273 | A1 | | 1/2022 |
| JP | 2011198688 | A | | 10/2011 |

OTHER PUBLICATIONS

The World Intellectual Property Organization (WIPO) International Search Report and Written Opinion for PCT/CN2023/077387 Jun. 2, 2023 12 Pages (including translation).
The Europea Patent Office (EPO) Extended Search Report for EP Application No. 23762778.1 Jun. 23, 2025 7 pages.

* cited by examiner

*Primary Examiner* — Muhammad S Siddiquee
(74) *Attorney, Agent, or Firm* — ANOVA LAW GROUP, PLLC

(57) ABSTRACT

A box structure includes a cooling member and a frame. The cooling member includes a main pipe and at least one branch pipe connected to the main pipe. The main pipe is configured to pass a coolant into the branch pipe, and the branch pipe is configured to contact the battery pack to cool the battery pack. An accommodation groove is created at a bottom of the frame, at least a part of the main pipe is located in the accommodation groove, and the main pipe is bonded and fixed to the accommodation groove.

14 Claims, 4 Drawing Sheets

BOX STRUCTURE, BATTERY, AND ELECTRICAL DEVICE

CROSS-REFERENCE TO RELATED APPLICATIONS

This application is a continuation of International Application No. PCT/CN2023/077387, filed on Feb. 21, 2023, which claims priority to Chinese Patent Application No. 2022204571967, filed on Mar. 3, 2022 and entitled "BOX STRUCTURE, BATTERY, AND ELECTRICAL DEVICE", the entire contents of both of which are incorporated herein by reference.

TECHNICAL FIELD

This application relates to the technical field of power batteries, and in particular, to a box structure, a battery, and an electrical device.

BACKGROUND

With the development of society, battery technology has been widely used in various fields, and the performance of the battery has attracted more and more attention. Among various performance metrics of the battery, heat dissipation of the battery affects the stability of the battery performance significantly. Therefore, how to endow the battery with superior heat dissipation performance has become an important research topic nowadays.

SUMMARY

In view of the above situation, it is necessary to provide a box structure, a battery, and an electrical device to reduce the weight and cost of the battery while ensuring effective cooling.

According to a first aspect, this application provides a box structure configured to accommodate a battery pack. The box structure includes a cooling member and a frame. The cooling member includes a main pipe and at least one branch pipe connected to the main pipe. The main pipe is configured to pass a coolant into the branch pipe. The branch pipe is configured to contact the battery pack to cool the battery pack. An accommodation groove is created at a bottom of the frame. At least a part of the main pipe is located in the accommodation groove. The main pipe is bonded and fixed to the accommodation groove.

In the box structure, a coolant is passed into a branch pipe by using a main pipe. The branch pipe is in contact with a battery pack to implement direct heat dissipation for the battery pack and improve heat transfer performance of the box structure. The main pipe is fixed in an accommodation groove by bonding, thereby eliminating a need of a bracket or another structure between the cooling member and the frame. This design simplifies the box structure while ensuring effective cooling, and makes the structure more lightweight and cost-efficient. In addition, in fixing the main pipe, the accommodation groove is created on the frame to increase a bonding area between the main pipe and the frame. This design increases the bonding strength between the cooling member and the frame, and ensures higher stability of the box structure.

In some embodiments, groove walls of the accommodation groove include a bottom wall as well as a first sidewall and a second sidewall connected to two ends of the bottom wall respectively. An opening is formed on one side, away from the bottom wall, of the first sidewall and the second sidewall. The main pipe is bonded and fixed to the accommodation groove through the opening. In this way, it is convenient to bond and fix the main pipe into the accommodation groove through the opening, thereby improving the assembling efficiency of the box structure.

In some embodiments, a cross-sectional shape of the main pipe is a rectangle. An outer wall of the main pipe is configured to be bonded to at least one of the bottom wall, the first sidewall, or the second sidewall. This design increases the bonding strength between the main pipe and the accommodation groove, and improves the stability of the box structure.

In some embodiments, an adhesive storage groove is disposed on at least one of a groove wall of the accommodation groove or an outer wall of the main pipe. The adhesive storage groove is configured to store a binder. In this way, the amount of adhesive retained between the accommodation groove and the main pipe is increased to avoid insufficient bonding strength caused by a large amount of adhesive overflow during bonding.

In some embodiments, at least two constraining ribs are disposed at intervals on the groove wall of the accommodation groove. The adhesive storage groove is formed between two adjacent constraining ribs. In this way, the adhesive storage groove is formed by using two adjacent constraining ribs, so that the glue is stably stored between the two constraining ribs, thereby increasing the bonding strength. In addition, the constraining ribs are disposed on the groove wall of the accommodation groove, thereby increasing the structural strength of the frame, and keeping the box structure stable.

In some embodiments, a groove wall of the accommodation groove is bonded to an outer wall of the main pipe by a structural adhesive to meet the requirement of bonding strength between the groove wall and the outer wall and improve the stability of the box structure.

In some embodiments, the box structure further includes a bottom plate. The bottom plate is disposed on one side, away from the frame, of the cooling member. The bottom plate is connected to the frame to support the cooling member. This design not only provides protection for the box structure, but also stably supports the cooling member. In this way, the cooling member is stably fixed to the frame to cool the battery pack conveniently in a stable and effective manner.

In some embodiments, the bottom plate includes a first plate body and a second plate body that are stacked up. The first plate body is located between the cooling member and the second plate body. A buffer structure is disposed on the first plate body. In this way, the external impact force or collision force transmitted toward the battery pack is weakened, a shock absorbing and buffering effect is achieved, and a ball impact from the bottom can be prevented from directly damaging the cooling member and the battery pack, thereby providing effective protection at the bottom.

In some embodiments, the first plate body protrudes toward the cooling member to form the buffer structure on one side of the first plate body, the side being oriented toward the second plate body. This design simplifies the manufacturing process of the buffer structure and improves the manufacturing efficiency while ensuring effective buffering.

In some embodiments, the first plate body protrudes toward the second plate body to form the buffer structure on one side of the first plate body, the side being oriented toward the cooling member. This design also simplifies the manufacturing process of the buffer structure and improves the manufacturing efficiency while ensuring effective buffering.

In some embodiments, the box structure further includes a protection plate. The protection plate is configured to cover the bottom plate from one side of the bottom plate, the side being away from the cooling member. The protection plate provides effective protection against external impact that is prone to damage the cooling member and the battery pack.

According to a second aspect, this application provides a battery. The battery includes a battery pack and the box structure disclosed in any one of the above embodiments.

According to a third aspect, this application provides an electrical device. The electrical device includes the battery. The battery is configured to provide electrical energy for the electrical device.

BRIEF DESCRIPTION OF DRAWINGS

By reading the following detailed description of exemplary embodiments, a person of ordinary skill in the art becomes clearly aware of various other advantages and benefits. The drawings are merely intended to illustrate the exemplary embodiments, but not to limit this application. In all the drawings, the same reference numeral represents the same component. In the drawings.

LIST OF REFERENCE NUMERALS

Figure 1:
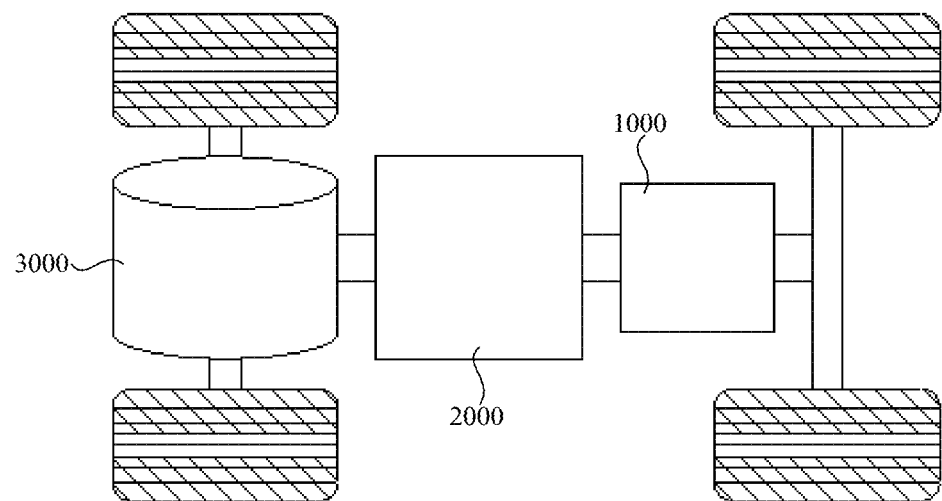
FIG. 1 is a schematic structural diagram of a vehicle according to some embodiments of this application.

1000. battery; 2000. controller; 3000. motor;
100. box structure; 110. cooling member; 111. main pipe; 112. branch pipe; 120. frame; 121. accommodation groove; 122. opening; 123. adhesive storage groove; 124. constraining rib; 125. first sidewall; 126. second sidewall; 127. bottom wall; 130. bottom plate; 131. first plate body; 132. second plate body; 133. buffer structure; 140. protection plate; 150. sealing element; 200. binder.

DETAILED DESCRIPTION OF EMBODIMENTS

Some embodiments of the technical solutions of this application are described in detail below with reference to the drawings. The following embodiments are merely intended as examples to describe the technical solutions of this application more clearly, but not intended to limit the protection scope of this application.

Unless otherwise defined, all technical and scientific terms used herein bear the same meanings as what is normally understood by a person skilled in the technical field of this application. The terms used herein are merely intended to describe specific embodiments but not to limit this application. The terms "include" and "contain" and any variations thereof used in the specification, claims, and brief description of drawings of this application are intended as non-exclusive inclusion.

In the description of some embodiments of this application, the technical terms "first" and "second" are merely intended to distinguish between different items but not intended to indicate or imply relative importance or implicitly specify the number of the indicated technical features, specific order, or order of precedence. In the description of some embodiments of this application, unless otherwise expressly specified, "a plurality of" means two or more.

Reference to an "embodiment" herein means that a specific feature, structure or characteristic described with reference to this embodiment may be included in at least one embodiment of this application. Reference to this term in different places in the specification does not necessarily represent the same embodiment, nor does it represent an independent or alternative embodiment in a mutually exclusive relationship with other embodiments. A person skilled in the art explicitly and implicitly understands that the embodiments described herein may be combined with other embodiments.

In the description of embodiments of this application, the term "and/or" merely indicates a relationship between related items, and represents three possible relationships. For example, "A and/or B" may represent the following three circumstances: A alone, both A and B, and B alone. In addition, the character "/" herein generally indicates an "or" relationship between the item preceding the character and the item following the character.

In the description of embodiments of this application, the term "a plurality of" means two or more (including two). Similarly, "a plurality of groups" means two or more groups (including two groups), and "a plurality of pieces" means two or more pieces (including two pieces).

In the description of embodiments of this application, a direction or a positional relationship indicated by the terms such as "center", "longitudinal", "transverse", "length", "width", "thickness", "up", "down", "before", "after", "left", "right", "vertical", "horizontal", "top", "bottom", "in", "out", "clockwise", "counterclockwise", "axial", "radial", and "circumferential" is a direction or positional relationship based on the illustration in the drawings, and is merely intended for ease or brevity of description of embodiments of this application, but not intended to indicate or imply that the indicated device or component is necessarily located in the specified direction or constructed or operated in the specified direction. Therefore, such terms are not to be understood as a limitation on embodiments of this application.

In the description of this application, unless otherwise expressly specified and defined, the technical terms such as "mount", "concatenate", "connect", and "fix" are generic in a broad sense, for example, mean a fixed connection, a detachable connection, or a one-piece configuration; or mean a mechanical connection or an electrical connection; or mean a direct connection or an indirect connection implemented through an intermediary; or mean internal communication between two components or interaction between two components. A person of ordinary skill in the art can understand the specific meanings of the terms in some embodiments of this application according to specific situations.

Currently, as can be seen from the market trend, the application of power batteries is increasingly extensive. Power batteries are not only used in energy storage power systems such as hydro, thermal, wind, and solar power stations, but also widely used in electric means of transport such as electric bicycles, electric motorcycles, and electric vehicles, and used in many other fields such as military equipment and aerospace. The market demand for power batteries keeps soaring with the expansion of the application fields of the power batteries.

The applicant hereof is aware that a battery generates a lot of heat during use. If the generated heat is not expelled effectively in time, the heat will severely impair the stability of the battery and shorten the lifespan of the battery. For this reason, a water cooling structure is usually disposed in the battery. The heat accumulated in the battery is expelled by using the heat exchange function of the water cooling structure. However, limited by inherent structural defects, the conventional water cooling structure results in unsatisfactory heat dissipation for the battery.

In order to improve the effect of heat dissipation of the battery, through research, the applicant finds that a harmonica-like water cooling plate may be added outside the bottom plate of the battery to enhance the heat dissipation effect of the battery. The existing harmonica-like water cooling plate is usually fixed to the bottom plate of the battery by using a bracket. When dissipating heat, the water cooling plate conducts heat through the bottom plate, bracket, and other structures of the battery, so as to exchange heat with the battery. However, this mounting method is still unable to effective heat dissipation and cooling for the battery, and at the same time, leads to an increase in the overall weight of the battery and an increase in production cost.

Based on the above considerations, in order to solve the problems of poor heat dissipation of the battery and increase of overall weight and cost of the battery caused by the harmonica-like water cooling plate, the applicant has conducted in-depth research and designed a box structure. In the box structure, an accommodation groove is created at the bottom of the frame. At least a part of the main pipe is located in the accommodation groove. The main pipe is fixed to the accommodation groove by bonding.

In such a box structure, a coolant is passed into a branch pipe by using a main pipe. The branch pipe is in contact with a battery pack to implement direct heat dissipation for the battery pack and improve heat transfer performance of the box structure. The main pipe is fixed in an accommodation groove by bonding, thereby eliminating a need of a bracket or another structure between the cooling member and the frame. This design simplifies the box structure while ensuring effective cooling, and makes the structure more lightweight and cost-efficient. In addition, in fixing the main pipe, the accommodation groove is created on the frame to increase a bonding area between the main pipe and the frame. This design increases the bonding strength between the cooling member and the frame, and ensures higher stability of the box structure.

The box structure disclosed in embodiments of this application is applicable to, but not limited to use in, electrical devices such as a vehicle, watercraft, or aircraft. A power supply system of the electrical devices may be formed by using the battery and the like disclosed herein, so as to reduce the weight and cost of the battery while ensuring effective cooling.

An embodiment of this application provides an electrical device powered by a battery. The electrical device may be, but is not limited to, a mobile phone, a tablet, a laptop computer, an electric toy, an electric tool, an electric power cart, an electric vehicle, a ship, a spacecraft, or the like. The electric toy may include stationary or mobile electric toys, such as a game console, an electric car toy, an electric ship toy, an electric airplane toy, and the like. The spacecraft may include an airplane, a rocket, a space shuttle, a spaceship, and the like.

For ease of description in the following embodiments, a vehicle is used as an example of the electrical device according to an embodiment of this application.

Referring to FIG. 1, FIG. 1 is a schematic structural diagram of a vehicle according to some embodiments of this application. The vehicle may be an internal combustion engine vehicle, a natural gas vehicle, or a new energy vehicle. The new energy vehicle may be a battery electric vehicle, a hybrid electric vehicle, a range-extended electric vehicle, or the like. A battery 1000 is disposed inside the vehicle. The battery 1000 may be disposed at the bottom, front, or rear of the vehicle. The battery 1000 may be configured to supply power to the vehicle. For example, the battery 1000 may serve as an operating power supply of the vehicle. The vehicle may further include a controller 2000 and a motor 3000. The controller 2000 is configured to control the battery 1000 to supply power to the motor 3000, for example, to meet electrical energy requirements in starting, navigating, or running the vehicle.

In some embodiments of this application, the battery 1000 serves not only as an operating power supply of the vehicle, but may also serve as a driving power supply of the vehicle to provide driving power for the vehicle in place of or partly in place of fuel oil or natural gas.

The battery 1000 includes a box structure 100 and a battery cell. The battery cell is accommodated in the box structure 100. The box structure 100 is configured to provide an accommodation space for the battery cell. In some embodiments, the box structure 100 may include a first part and a second part. The first part and the second part fit and cover each other. The first part and the second part together define an accommodation space configured to accommodate the battery cell.

The battery 1000 may contain a plurality of battery cells. The plurality of battery cells may be connected in series, parallel, or series-and-parallel pattern. The series-and-parallel pattern means a combination of series connection and parallel connection of the plurality of battery cells. The plurality of battery cells may be directly connected in series, parallel, or series-and-parallel pattern, and then the whole of the plurality of battery cells may be accommodated in the box. Alternatively, to make up a battery 1000, the plurality of battery cells may be connected in series, parallel, or series-and-parallel pattern to form a battery 1000 module first, and then a plurality of battery 1000 modules are connected in series, parallel, or series-and-parallel pattern to form a whole and accommodated in the box structure 100.

Each battery cell may be, but is not limited to, a secondary battery or primary battery; or, may be a lithium-sulfur battery, a sodium-ion battery, or a magnesium-ion battery. The battery cell may be in a shape such as a cylinder, a flat body, a cuboid, or other shapes.

Figure 2:
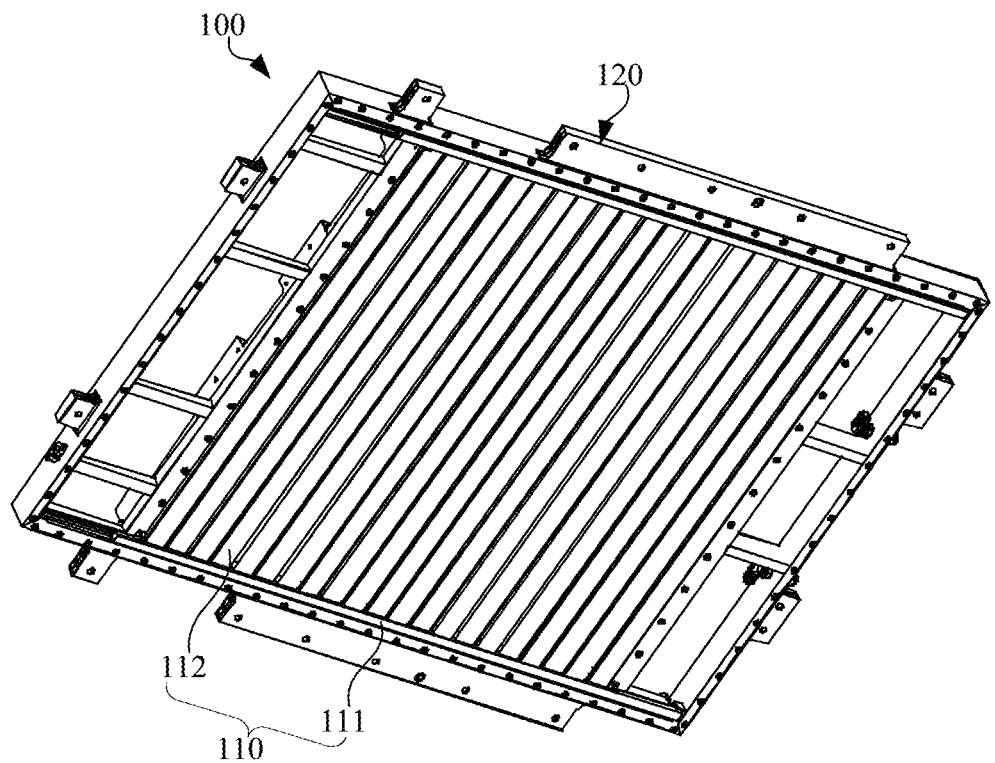
FIG. 2 is a schematic structural diagram of a box structure according to some embodiments of this application.
Figure 3:
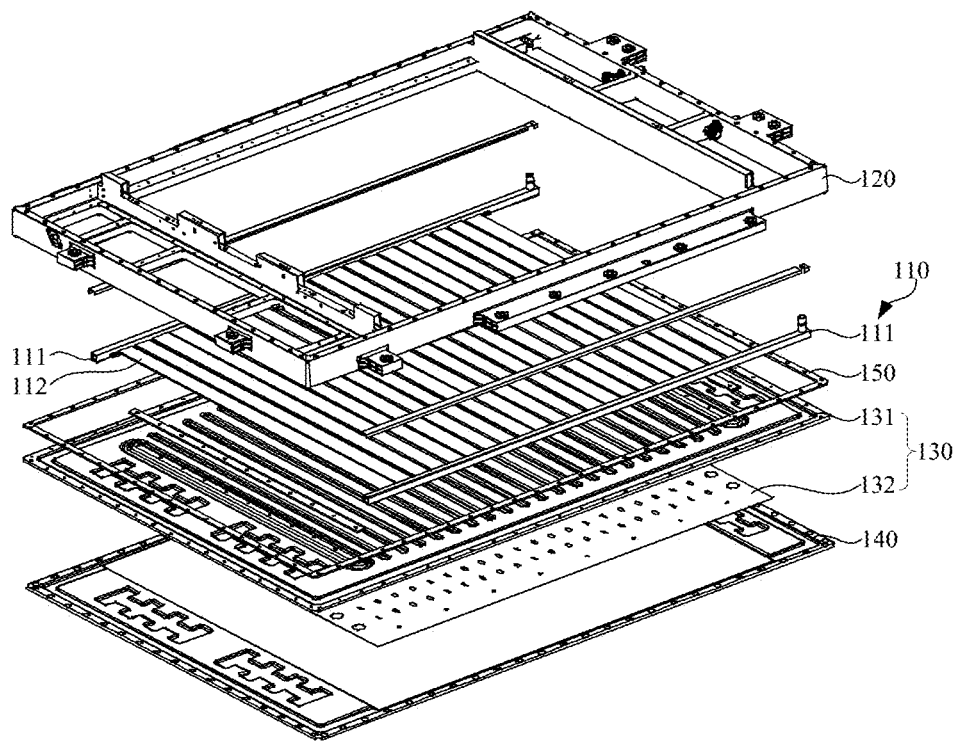
FIG. 3 is a schematic exploded view of a box structure according to some embodiments of this application.
Figure 4:
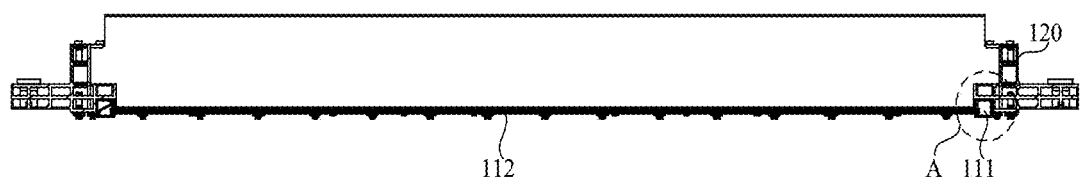
FIG. 4 is a first cross-sectional view of a box structure according to some embodiments of this application.
Figure 5:
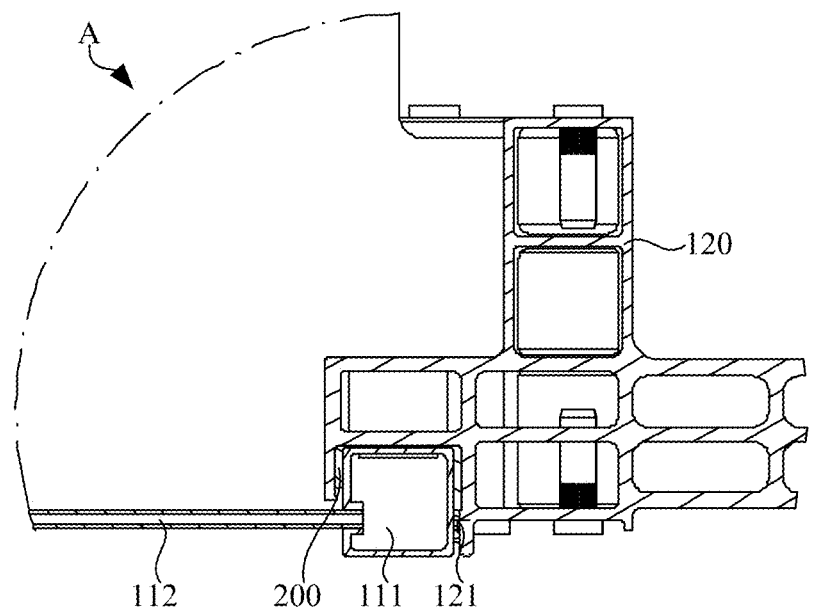
FIG. 5 is a close-up view of a part A circled in FIG. 4.

According to some embodiments of this application, this application provides a box structure 100 configured to accommodate a battery pack. Referring to FIG. 2, the box structure 100 includes a cooling member 110 and a frame 120. Referring to FIG. 3, the cooling member 110 includes a main pipe 111 and at least one branch pipe 112 connected to the main pipe 111. The main pipe 111 is configured to pass a coolant into the branch pipe 112. The branch pipe 112 is configured to contact the battery pack to cool the battery pack. Referring to FIG. 4 and FIG. 5, an accommodation groove 121 is created at the bottom of the frame 120. At least a part of the main pipe 111 is located in the accommodation groove 121. The main pipe 111 is bonded and fixed to the accommodation groove 121.

The battery pack may be in the form of a battery module. A plurality of battery cells are connected in series, parallel, or series-and-parallel pattern and then packaged to form the battery 1000 module. Alternatively, the battery pack may be just a structure formed by connecting several battery cells in series, parallel, or series-and-parallel pattern. When the battery pack is in contact with the branch pipe 112 in the box structure 100, the outer wall of the branch pipe 112 may be directly affixed to the battery pack. In this case, no other structures such as extruded profiles exist between the battery pack and the cooling member 110. Definitely, in order to improve the heat conduction between the battery pack and the cooling member, a heat-conducting material, such as a thermal adhesive, may be applied to a fitting surface between the battery pack and the cooling member 110. The thermal adhesive means a single-component, thermally conductive, room-temperature-cured silicone adhesive sealant formed through a condensation reaction between a silicone polymer and the moisture in the air, and is a high-performance elastomer vulcanized from the silicone adhesive by crosslinking and curing caused by release of micromolecular byproducts in the condensation reaction, and is also referred to as thermally conductive silicone.

The cross-sectional shape of the accommodation groove 121 may be diversified. For example, the cross-sectional shape of the accommodation groove 121 may be designed to be, but not limited to, square, circular, elliptical, pentagonal, or the like. The cross-sectional shape of the main pipe 111 may also be diversified. However, if the cross-sectional shape of the main pipe 111 is identical to the cross-sectional shape of the accommodation groove 121, the bonding strength between the main pipe 111 and the accommodation groove 121 can be further increased.

In addition, the coolant may be a liquid, a gas, or the like. The type of the coolant is not particularly limited herein, as long as the coolant can be passed into the main pipe 111 to cool the battery pack.

The main pipe 111 is fixed in the accommodation groove 121 by bonding, thereby eliminating the need of a bracket or another structure between the cooling member 110 and the frame 120. This design simplifies the box structure 100 while ensuring effective cooling, and makes the structure more lightweight and cost-efficient. In addition, in fixing the main pipe 111, the accommodation groove 121 is created on the frame 120 to increase the bonding area between the main pipe 111 and the frame 120. This design increases the bonding strength between the cooling member 110 and the frame 120, and ensures higher stability of the box structure 100.

Figure 6:
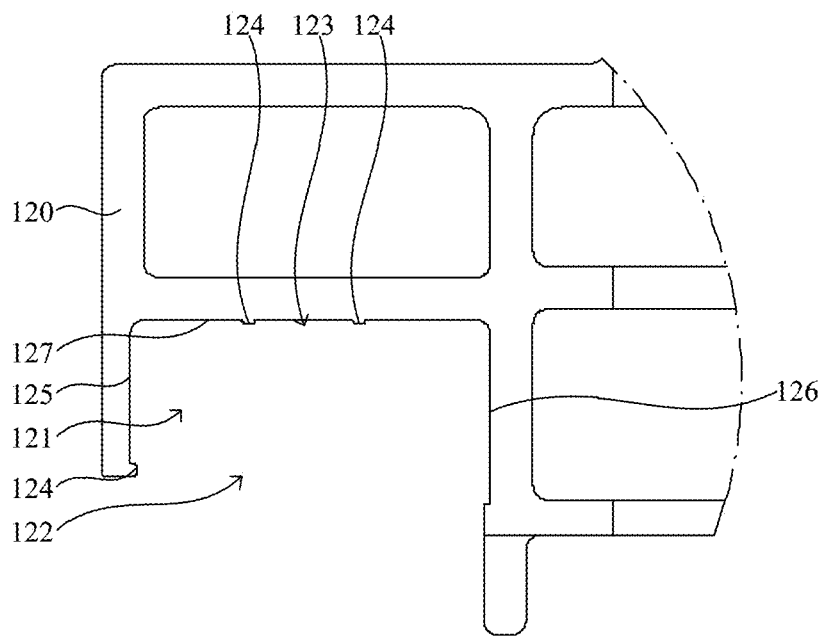
FIG. 6 is a close-up view of an accommodation groove according to some embodiments of this application.

According to some embodiments of this application, referring to FIG. 6, the groove walls of the accommodation groove 121 include a bottom wall 127 as well as a first sidewall 125 and a second sidewall 126 connected to two ends of the bottom wall 127 respectively. An opening 122 is formed on one side, away from the bottom wall 127, of the first sidewall 125 and the second sidewall 126. The main pipe 111 is bonded and fixed to the accommodation groove 121 through the opening 122.

The size of the opening 122 may be configured to be greater than or equal to the outer dimensions of the main pipe 111, so that the main pipe 111 can be conveniently bonded into the accommodation groove 121. Alternatively, the size of the opening 122 may be configured to be slightly smaller than the outer dimensions of the main pipe 111.

During the bonding, the main pipe 111 needs to squeeze against the opening 122 to deform the opening so that the main pipe 111 is pressed into the accommodation groove 121. Such an opening 122 can constrain the main pipe 111 in the accommodation groove 121 and prevent the main pipe from falling out of the accommodation groove 121.

In addition, during bonding, in order to increase the bonding strength, surface treatment may be performed on the bottom wall 127, the first sidewall 125, and the second sidewall 126, separately. For example, sanding, embossment, or another process may be performed on the bottom wall 127, the first sidewall 125, and the second sidewall 126 to increase the adhesive bonding ability of the corresponding wall faces.

With the opening 122 formed on one side, away from the bottom wall 127, of the first sidewall 125 and the second sidewall 126, it is convenient to bond and fix the main pipe 111 into the accommodation groove 121 through the opening 122, thereby improving the assembling efficiency of the box structure 100.

According to some embodiments of this application, referring to FIG. 5, the cross-sectional shape of the main pipe 111 is a rectangle. The outer wall of the main pipe 111 is configured to be bonded to at least one of the bottom wall 127, the first sidewall 125, or the second sidewall 126.

The outer wall of the main pipe 111 may be bonded to one of the bottom, the first sidewall 125, or the second sidewall 126; or may be bonded to any two of the bottom, the first sidewall, or the second sidewall; or, the outer wall of the main pipe 111 may be bonded to the bottom, the first sidewall 125, and the second sidewall 126 concurrently. The cross-section of the main pipe 111 may be understood as: a plane obtained by sectioning the main pipe 111 along a plane perpendicular to the axis of the main pipe 111.

Designed as a rectangular shape, the cross-sectional shape of the main pipe 111 makes it more convenient to bond the outer wall of the main pipe 111 to at least one of the bottom wall 127, the first sidewall 125, or the second sidewall 126, thereby increasing the bonding strength in between and improving the stability of the box structure 100.

According to some embodiments of this application, referring to FIG. 5 and FIG. 6, an adhesive storage groove 123 is disposed on at least one of a groove wall of the accommodation groove 121 or the outer wall of the main pipe 111. The adhesive storage groove 123 is configured to store a binder.

The adhesive storage groove 123 may be positioned on the groove wall of the accommodation groove 121 or on the outer wall of the main pipe 111. Alternatively, the adhesive storage groove may be positioned on the both groove wall of the accommodation groove 121 and the outer wall of the main pipe 111.

The adhesive storage groove 123 may be a complete groove structure in the length direction of the frame 120, or may be a structure formed from a plurality of short grooves arranged at intervals. In the circumferential direction of the accommodation groove 121, the number of the adhesive storage grooves 123 may be one or more. For example, the adhesive storage groove 123 is created on at least one of the bottom wall, the first sidewall 125, or the second sidewall 126.

The adhesive storage groove 123 is created on at least one of the groove wall of the accommodation groove 121 or the outer wall of the main pipe 111 to increase the amount of adhesive retained between the accommodation groove 121 and the main pipe 111, thereby avoiding insufficient bonding strength caused by a large amount of adhesive overflow during bonding.

According to some embodiments of this application, referring to FIG. 6, at least two constraining ribs 124 are disposed at intervals on the groove wall of the accommodation groove 121. The adhesive storage groove 123 is formed between two adjacent constraining ribs 124.

The method by which the constraining rib 124 is connected to the groove wall of the accommodation groove 121 may be, but is not limited to, bolting, snap-fitting, welding, riveting, one-piece molding, or the like. The one-piece molding may be implemented by injection molding, die-casting, extrusion, stamping, or the like.

Definitely, in some other embodiments, the adhesive storage groove 123 may be formed on the groove wall of the accommodation groove 121 by directly carving a groove on the groove wall of the accommodation groove 121, so that one or more adhesive storage grooves 123 are formed.

The adhesive storage groove 123 is formed by using two adjacent constraining ribs 124, so that the glue is stably stored between the two constraining ribs 124, thereby increasing the bonding strength. In addition, the constraining ribs 124 are disposed on the groove wall of the accommodation groove 121, thereby increasing the structural strength of the frame 120, and keeping the box structure 100 stable.

According to some embodiments of this application, referring to FIG. 5, the groove wall of the accommodation groove 121 is bonded to the outer wall of the main pipe 111 by a structural adhesive.

There are a variety of structural adhesives. For example, the structural adhesive may be, but is not limited to, epoxy resin, polyurethane, or the like. The type of the structural adhesive is not particularly limited herein as long as the structural adhesive can meet the requirement of bonding between the groove wall of the accommodation groove 121 and the outer wall of the main pipe 111.

The groove wall of the accommodation groove 121 is bonded to the outer wall of the main pipe 111 by a structural adhesive to meet the requirement of bonding strength between the groove wall and the outer wall and improve the stability of the box structure 100.

According to some embodiments of this application, referring to FIG. 3, the box structure 100 further includes a bottom plate 130. The bottom plate 130 is disposed on one side, away from the frame 120, of the cooling member 110. The bottom plate 130 is connected to the frame 120 to support the cooling member 110.

The method by which the bottom plate 130 is connected to the frame 120 may be, but is not limited to, bolting, snap-fitting, pin connection, welding, riveting, or the like.

In addition, a sealing element 150, such as sealing foam, may be disposed between the bottom plate 130 and the frame 120 to enhance the hermeticity between the bottom plate 130 and the frame 120.

The bottom plate 130 is disposed on one side, away from the frame 120, of the cooling member 110, thereby not only providing protection (for example, against ball impact) for the box structure 100, but also stably supporting the cooling member 110. In this way, the cooling member is stably fixed to the frame 120 to cool the battery pack conveniently in a stable and effective manner.

Figure 7:
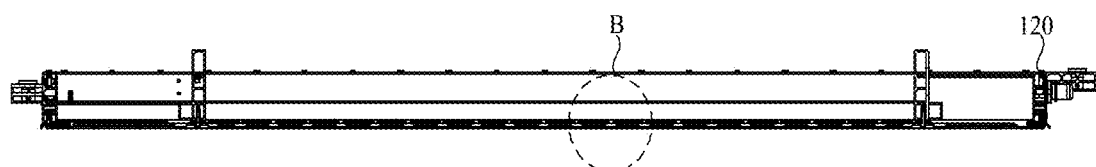
FIG. 7 is a second cross-sectional view of a box structure according to some embodiments of this application.
Figure 8:
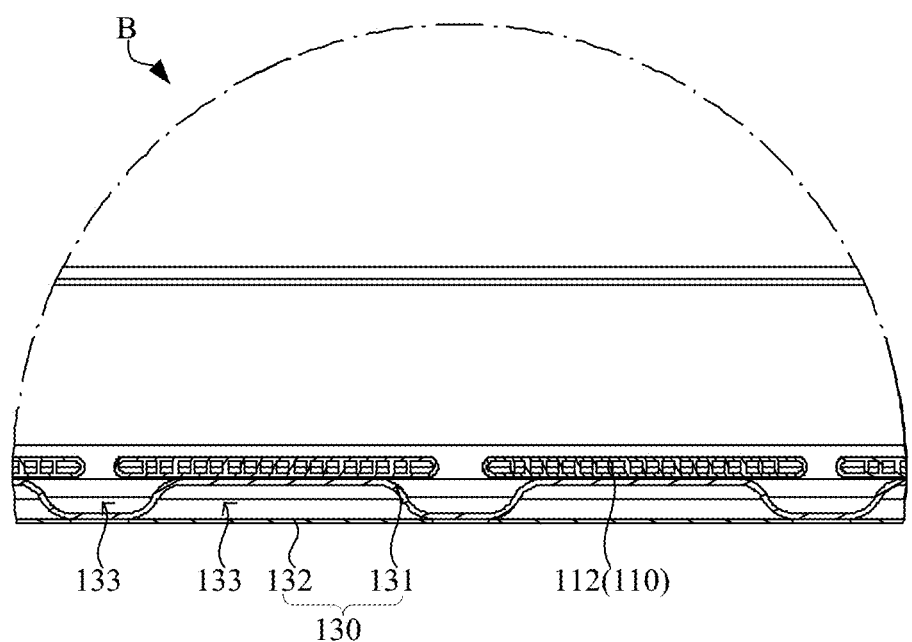
FIG. 8 is a close-up view of a part B circled in FIG. 7.

According to some embodiments of this application, referring to FIG. 7 and FIG. 8, the bottom plate 130 includes a first plate body 131 and a second plate body 132 that are stacked up. The first plate body 131 is located between the cooling member 110 and the second plate body 132. A buffer structure 133 is disposed on the first plate body 131.

The buffer structure 133 can absorb the impact or collision energy on the bottom plate 130, weaken the impact or collision force transmitted toward the battery pack, so as to achieve a shock-absorbing and buffering effect and effectively protect the battery pack against damage caused by external impact or collision. The buffer structure 133 may be designed in a variety of forms. For example, the buffer structure 133 may be a cavity structure, or may be an elastomer such as a rubber plate, a foam plastic plate, or the buffer structure 133 may be a honeycomb elastic structure or the like.

The buffer structure 133 may be disposed on the first plate body 131 to weaken the external impact force or collision force transmitted toward the battery pack, achieve a shock absorbing and buffering effect, and prevent a ball impact from the bottom from directly damaging the cooling member 110 and the battery pack, thereby providing effective protection at the bottom.

According to some embodiments of this application, referring to FIG. 8, the first plate body 131 protrudes toward the cooling member 110 to form the buffer structure 133 on one side of the first plate body 131, the side being oriented toward the second plate body 132.

The buffer structure 133 is a spatial structure, that is, a recessed portion on the first plate body 131. In a buffering process, the buffer structure 133 allows the second plate body 132 to deform toward the first plate body 131 to absorb the external impact or collision energy and weaken the impact force or collision force transmitted to the battery pack.

The buffer structure 133 can be formed by protruding the first plate body 131 toward the cooling member 110. In this way, the manufacturing process of the buffer structure 133 is simplified and the manufacturing efficiency is improved while ensuring effective buffering.

According to some embodiments of this application, referring to FIG. 8, the first plate body 131 protrudes toward the second plate body 132 to form the buffer structure 133 on one side of the first plate body 131, the side being oriented toward the cooling member 110.

The buffer structure 133 formed by the first plate body 131 protruding toward the second plate body 132 and the buffer structure 133 formed by the first plate body 131 protruding toward the cooling member 110 can form a wavy structure, thereby not only increasing the structural strength of the bottom plate 130, but also enhancing the buffering effect on the bottom plate 130.

The buffer structure 133 can be formed by protruding the first plate body 131 toward the second plate body 132. In this way, the manufacturing process of the buffer structure 133 is simplified and the manufacturing efficiency is improved while ensuring effective buffering.

According to some embodiments of this application, referring to FIG. 3, the box structure 100 further includes a protection plate 140. The protection plate 140 is configured to cover the bottom plate 130 from one side of the bottom plate 130, the side being away from the cooling member 110.

The protection plate 140 covers the bottom plate 130 to provide effective protection for the bottom plate 130. In practical production, the bottom plate 130 may be in a variety of forms. For example, the bottom plate 130 may be a steel plate, a PVC plate, or the like. In addition, in order to reduce the overall weight of the box structure 100, a plurality of perforated structures may be created on the bottom plate 130.

The protection plate 140 provides effective protection for the bottom plate 130 against external impact that is prone to damage the cooling member 110 and the battery pack.

According to some embodiments of this application, this application further provides a battery 1000. The battery 1000 includes a battery pack and the box structure 100 disclosed in any one of the above technical solutions.

According to some embodiments of this application, this application further provides an electrical device. The electrical device includes the battery 1000 disclosed in any one of the above technical solutions.

The electrical device may be any device or system in which the battery 1000 is applied. The battery is configured to provide electrical energy for the electrical device.

According to some embodiments of this application, referring to FIG. 2 to FIG. 8, this application provides a box structure 100 with a profile frame 120 integrated with a harmonica-like water cooling plate. The box structure includes a frame 120, a structural adhesive, a cooling member 110, a sealing element 150, a first plate body 131, a second plate body 132, and a protection plate 140. The cooling member 110 is bonded and fixed to the frame 120, without the need for a fixing bracket structure, thereby achieving a simple structure, a lighter weight, and higher cost-efficiency. In addition, the cooling member 110 is built-in and in contact with the battery pack through a thermal adhesive, thereby exhibiting high performance of heat transfer. The first plate body 131 and the second plate body 132 are designed as a double-layer stamped spot-welded structure that includes few structural components and occupies little space in the Z-direction (≤15 mm), so that the space utilization rate is high. In addition, the first plate body 131 is stamped into a wavy shape, and can effectively support the cooling member 110. The second plate body 132 is disposed beneath the first plate body 131, thereby enhancing energy absorption and ensuring high performance of protecting the bottom of the box against ball impact.

Finally, it is hereby noted that the foregoing embodiments are merely intended to describe the technical solutions of this application but not to limit this application. Although this application has been described in detail with reference to the foregoing embodiments, a person of ordinary skill in the art understands that modifications may still be made to the technical solutions described in the foregoing embodiments, or equivalent replacements may still be made to some or all technical features in the technical solutions. Such modifications and equivalent replacements fall within the scope of the claims and specification hereof without making the essence of the corresponding technical solutions depart from the scope of the technical solutions of the embodiments of this application. Particularly, to the extent that no structural conflict exists, various technical features mentioned in different embodiments may be combined in any manner. This application is not limited to the specific embodiments disclosed herein, but includes all technical solutions falling within the scope of the claims.

What is claimed is:

1. A box structure, configured to accommodate a battery pack, comprising:
a cooling member, comprising a main pipe and at least one branch pipe connected to the main pipe, wherein the main pipe is configured to pass a coolant into the branch pipe, and the branch pipe is configured to contact the battery pack to cool the battery pack; and
a frame, wherein an accommodation groove is created at a bottom of the frame, at least a part of the main pipe is located in the accommodation groove, and the main pipe is bonded and fixed to the accommodation groove; wherein an adhesive storage groove is disposed on at least one of a groove wall of the accommodation groove or an outer wall of the main pipe, and the adhesive storage groove is configured to store a binder.

2. The box structure according to claim 1, wherein:
the groove wall of the accommodation groove is one of a plurality of groove walls of the accommodation groove;
the plurality of groove walls of the accommodation groove comprise:
a bottom wall; and
a first sidewall and a second sidewall connected to two ends of the bottom wall, respectively;
an opening is formed on one side, away from the bottom wall, of the first sidewall and the second sidewall; and
the main pipe is bonded and fixed to the accommodation groove through the opening.

3. The box structure according to claim 2, wherein a cross-sectional shape of the main pipe is a rectangle, and the outer wall of the main pipe is configured to be bonded to at least one of the bottom wall, the first sidewall, or the second sidewall.

4. The box structure according to claim 1, wherein at least two constraining ribs are disposed at intervals on the groove wall of the accommodation groove, and the adhesive storage groove is formed between two adjacent constraining ribs.

5. The box structure according to claim 1, wherein the groove wall of the accommodation groove is bonded to the outer wall of the main pipe by a structural adhesive.

6. The box structure according to claim 1, further comprising:
a bottom plate, disposed on one side, away from the frame, of the cooling member, wherein the bottom plate is connected to the frame to support the cooling member.

7. The box structure according to claim 6, wherein the bottom plate comprises a first plate body and a second plate body that are stacked one on another, the first plate body is located between the cooling member and the second plate body, and a buffer structure is disposed on the first plate body.

8. The box structure according to claim 7, wherein the first plate body protrudes toward the cooling member to form the buffer structure on one side of the first plate body, the one side facing the second plate body.

9. The box structure according to claim 7, wherein the first plate body protrudes toward the second plate body to form the buffer structure on one side of the first plate body, the one side facing the cooling member.

10. The box structure according to claim 6, further comprising:
a protection plate, configured to cover the bottom plate from one side of the bottom plate, the one side being away from the cooling member.

11. A battery, comprising:
the box structure according to claim 1; and
a battery pack accommodated in the box structure.

12. An electrical device, comprising the battery according to claim 11, wherein the battery is configured to provide electrical energy for the electrical device.

13. A box structure, configured to accommodate a battery pack, comprising:
a cooling member, comprising a main pipe and at least one branch pipe connected to the main pipe, wherein the main pipe is configured to pass a coolant into the branch pipe, and the branch pipe is configured to contact the battery pack to cool the battery pack;

a frame, wherein an accommodation groove is created at a bottom of the frame, at least a part of the main pipe is located in the accommodation groove, and the main pipe is bonded and fixed to the accommodation groove; and a bottom plate, disposed on one side, away from the frame, of the cooling member, wherein the bottom plate is connected to the frame to support the cooling member;

wherein the bottom plate comprises a first plate body and a second plate body that are stacked one on another, the first plate body is located between the cooling member and the second plate body, and a buffer structure is disposed on the first plate body.

14. A box structure, configured to accommodate a battery pack, comprising:

a cooling member, comprising a main pipe and at least one branch pipe connected to the main pipe, wherein the main pipe is configured to pass a coolant into the branch pipe, and the branch pipe is configured to contact the battery pack to cool the battery pack; and a frame, wherein an accommodation groove is created at a bottom of the frame, at least a part of the main pipe is located in the accommodation groove, and the main pipe is bonded and fixed to the accommodation groove;

wherein a groove wall of the accommodation groove is bonded to an outer wall of the main pipe by a structural adhesive.

* * * * *